(12) United States Patent  
Jeon et al.

(10) Patent No.: US 11,818,477 B2  
(45) Date of Patent: Nov. 14, 2023

(54) IMAGE PROCESSING DEVICE AND OPERATION METHOD THEREOF

(71) Applicant: RESEARCH & BUSINESS FOUNDATION SUNGKYUNKWAN UNIVERSITY, Suwon-si (KR)

(72) Inventors: Byeungwoo Jeon, Seongnam-si (KR); Jaelin Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/849,178

(22) Filed: Jun. 24, 2022

(65) Prior Publication Data

US 2022/0417475 A1    Dec. 29, 2022

(30) Foreign Application Priority Data

Jun. 24, 2021    (KR) .................. 10-2021-0082196

(51) Int. Cl.
*H04N 25/615*    (2023.01)
*G06T 5/00*    (2006.01)
*H04N 23/56*    (2023.01)
*H04N 23/73*    (2023.01)
*H04N 23/74*    (2023.01)

(52) U.S. Cl.
CPC ......... *H04N 25/6153* (2023.01); *G06T 5/003* (2013.01); *H04N 23/56* (2023.01); *H04N 23/73* (2023.01); *H04N 23/74* (2023.01); *G06T 2207/10024* (2013.01); *G06T 2207/20048* (2013.01)

(58) Field of Classification Search
CPC .... H04N 25/6153; H04N 23/56; H04N 23/73; H04N 23/74; H04N 23/68; H04N 23/80; G06T 5/003; G06T 2207/10024; G06T 2207/20048
See application file for complete search history.

(56) References Cited

U.S. PATENT DOCUMENTS

| 7,580,620 B2 | 8/2009 | Raskar et al. |
| 10,762,613 B2 | 9/2020 | Derakhshani |

(Continued)

FOREIGN PATENT DOCUMENTS

KR    10-2013-0052994 A    5/2013

OTHER PUBLICATIONS

Agrawal, Amit, et al., "Invertible motion blur in video." ACM SIGGRAPH 2009 papers. 2009, (10 pages in English).

(Continued)

*Primary Examiner* — Ahmed A Berhan
(74) *Attorney, Agent, or Firm* — NSIP Law

(57) ABSTRACT

There is provided an image processing device including: a plurality of light sources each emitting a plurality of lights; a camera outputting a first subject image obtained by photographing a subject; and a control unit controlling each of the plurality of light sources according to an optical coded pattern set based on a complex modulation transfer function during a shutter exposure time of the camera, and outputting a second subject image in which motion blur is removed from the first subject image according to point spread functions for each color channel modulated by the optical coded pattern set.

11 Claims, 5 Drawing Sheets

(56) References Cited

U.S. PATENT DOCUMENTS

| | | | | |
|---|---|---|---|---|
| 2011/0081142 A1* | 4/2011 | Tsai | ..................... | H04N 23/74 |
| | | | | 396/173 |
| 2013/0120601 A1* | 5/2013 | Han | ..................... | H04N 23/73 |
| | | | | 382/167 |

OTHER PUBLICATIONS

Jeon, Hae-Gon, et al. "Multi-image Deblurring Using Complementary Sets of Fluttering Patterns." IEEE Transactions on Image Processing 26.5 (2017): 2311-2326.

Cui, Guangmang, et al. "Multi-frame motion deblurring using coded exposure imaging with complementary fluttering sequences." Optics & Laser Technology 126 (Feb. 2020): 106119, (13 pages in English).

Lee, Jaelin et al. "Multi-channel image deblurring using coded flashes." *International Workshop on Advanced Imaging Technology (IWAIT)* 2021. vol. 11766. SPIE (Mar. 13, 2021). pp. 68-73.

\* cited by examiner

IMAGE PROCESSING DEVICE AND OPERATION METHOD THEREOF

CROSS-REFERENCE TO RELATED APPLICATION(S)

This application claims benefit of priority to Korean Patent Application No. 10-2021-0082196 filed on Jun. 24, 2021 in the Korean Intellectual Property Office, the disclosure of which is incorporated herein by reference in its entirety.

BACKGROUND

1. Field

The present disclosure relates to an image processing device and an operation method thereof, and more particularly, to an image processing device that easily outputs a clear second subject image in which motion blur is removed from a first subject image obtained by photographing a subject, and an operation method thereof.

2. Description of Related Art

Assume that a moving subject is photographed with a color camera. Traditionally, various algorithms have been applied in order to clearly reconstruct motion blur in an image generated by the moving subject or a moving camera.

Recently, photography called coded exposure photography (CEP) has been invented, which is a technology that obtains a clear image by modulating a pattern of a shutter or an illumination.

Traditional CEP has obtained an image using a coded shutter (or a flutter shutter) operating at high speed or a coded illumination operating at high speed.

The coded devices described above operate according to a coded pattern that operates these coded devices.

When a moving subject is photographed using the coded device, a point spread function (PSF) of a still image obtained during a camera exposure time is modulated by the coded device.

If an inverse transform property of the coded pattern is good, noise is significantly decreased when a clear still image is calculated from a still image with motion blur.

However, for color still images, CEP technologies that use opening or closing of a shutter or a white light source have been able to apply only a single coded pattern to color or black-and-white images so far.

In order to improve reconstruction performance of an image, a technology that obtains several still images (=moving image) and then applies a different single coded pattern to each still image has recently been proposed.

Such a technology is a technology that uses several still images and several coded patterns in order to reconstruct one clear still image. However, the several still images have noise generated due to different temporal/spatial errors.

Recently, a research into a technology that decreases the motion blur generated in the still images has been conducted.

SUMMARY

An aspect of present disclosure provides an image processing device that easily outputs a clear second subject image in which motion blur is removed from a first subject image obtained by photographing a subject, and an operation method thereof.

An aspect of present disclosure also provides an image processing device capable of turning on/off a plurality of light sources by generating different optical coded patterns according to point spread functions (PSFs) for each of a plurality of different light source channels, and an operation method thereof.

An aspect of present disclosure also provides an image processing device that outputs a second subject image in which motion blur is removed from a first subject image obtained by photographing a subject by allowing light of different colors to be emitted with different optical coded patterns at the time of photographing the subject, and an operation method thereof.

Aspects of the present disclosure are not limited to the above-described aspects, and other aspects and advantages of the present disclosure that are not mentioned may be understood by the following description and will be more clearly understood by embodiments of the present disclosure. In addition, it may be easily appreciated that aspects and advantages of the present disclosure may be realized by means mentioned in the claims and a combination thereof.

According to an aspect of the present disclosure, an image processing device may include: a plurality of light sources each emitting a plurality of lights; a camera outputting a first subject image obtained by photographing a subject; and a control unit controlling each of the plurality of light sources according to an optical coded pattern set based on a complex modulation transfer function during a shutter exposure time of the camera, and outputting a second subject image in which motion blur is removed from the first subject image according to point spread functions for each color channel modulated by the optical coded pattern set.

The control unit may include: a signal generator generating the optical coded pattern set based on the complex modulation transfer function during the shutter exposure time; an operation unit controlling a turn-on/off operation of each of the plurality of light sources according to the optical coded pattern set; and a signal processor outputting the second subject image in which the motion blur is removed based on complex modulation transfer function values of the point spread functions for each channel from the first subject image.

The optical coded pattern set may include optical coded patterns for each of a plurality of color channels corresponding to the plurality of lights and complementary to each other.

The optical coded patterns for each of the plurality of color channels may have different turn-on/off timings for each of the plurality of lights.

The signal processing unit may calculate the complex modulation transfer function values by performing a Fourier transform of the point spread functions for each channel modulated by the optical coded pattern set.

The signal processing unit may output the second subject image by performing deconvolution of the point spread functions for each channel in the first subject image based on the complex modulation transfer function values.

According to another aspect of the present disclosure, an operation method of an image processing device may include: generating an optical coded pattern set based on a complex modulation transfer function so that a plurality of lights are emitted from a plurality of light sources; controlling each of the plurality of light sources with the optical coded pattern set so that a camera photographs a subject during a shutter exposure time; and outputting a second subject image in which motion blur is removed from a first subject image according to point spread functions for each color channel modulated by the optical coded pattern set when the first subject image is input from the camera, the first subject image being obtained by photographing the subject.

The optical coded pattern set may include optical coded patterns for each of a plurality of color channels corresponding to the plurality of lights, determined by the complex modulation transfer function, and complementary to each other, and the optical coded patterns for each of the plurality of color channels may have different turn-on/off timings for each of the plurality of lights.

In the outputting of the second subject image, the second subject image in which the motion blur is removed based on complex modulation transfer function values of the point spread functions for each channel from the first subject image may be output.

In the outputting of the second subject image, the second subject image may be output by performing deconvolution of the point spread functions for each channel in the first subject image based on the complex modulation transfer function values.

DETAILED DESCRIPTION

Figure 1:
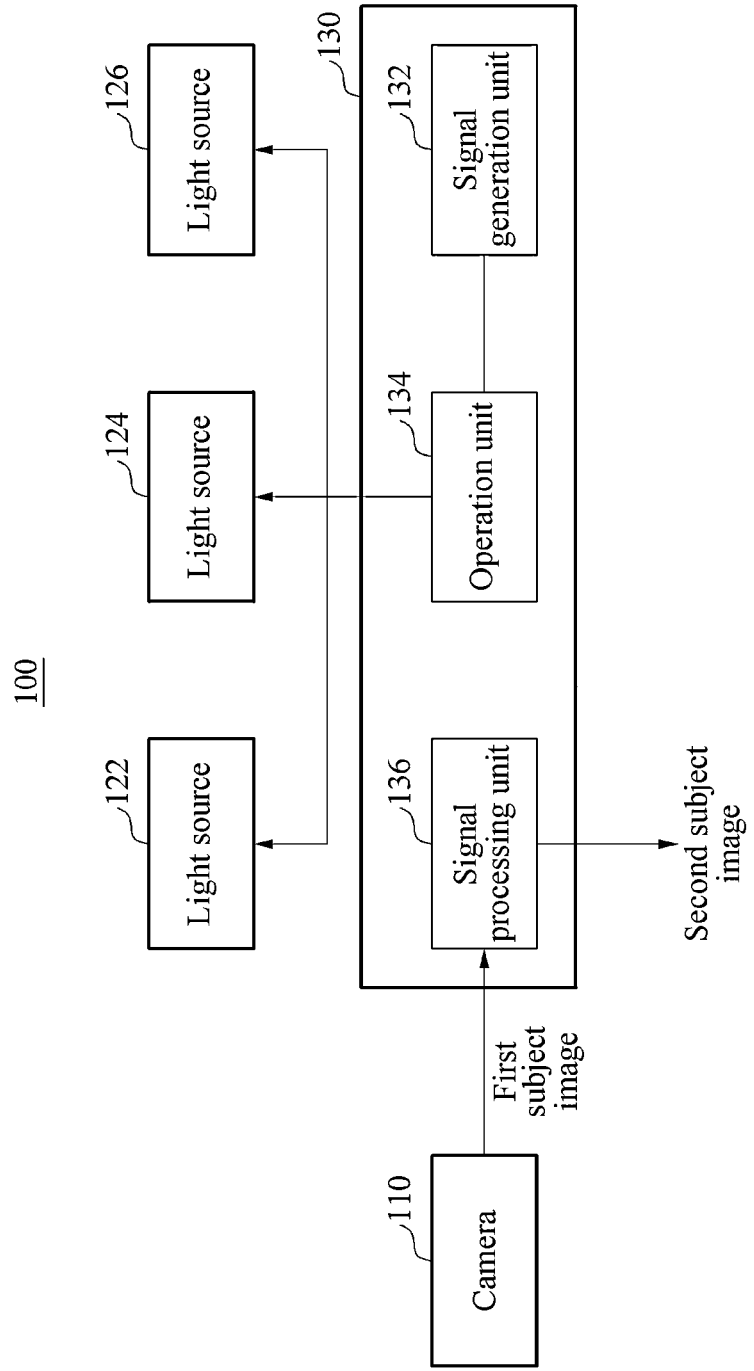
FIG. 1 is a control block diagram illustrating control components of an image processing device according to the present disclosure.

The present disclosure may be variously modified and have several embodiments, and thus, specific embodiments will be illustrated in the accompanying drawings and be described in detail. However, it is to be understood that the present disclosure is not limited to a specific embodiment, but includes all modifications, equivalents, and substitutions without departing from the spirit and scope of the present disclosure. Throughout the drawings, similar components will be denoted by similar reference numerals.

The terms such as 'first', 'second', 'A', and 'B' may be used to describe various components, but these components are not to be limited by these terms. These terms are used only to distinguish one component from another component. For example, a 'first' component may be named a 'second' component and the 'second' component may also be similarly named the 'first' component, without departing from the scope of the present disclosure. The term 'and/or' includes a combination of a plurality of related described items or any one of the plurality of related described items.

It is to be understood that when one component is referred to as being "connected to" or "coupled to" another component, one component may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween.

The terms used herein are used only in order to describe specific embodiments rather than limiting the present disclosure. Singular forms are intended to include plural forms unless the context clearly indicates otherwise. It is to be understood that the terms "include" or "has" used herein specify the presence of features, numerals, steps, operations, components, parts mentioned in the present specification, or combinations thereof, and do not preclude the presence or addition of one or more other features, numerals, steps, operations, components, parts, or combinations thereof.

Unless defined otherwise, it is to be understood that all the terms used herein including technical and scientific terms have the same meanings as those generally understood by those skilled in the art to which the present disclosure pertains. The terms as defined by a generally used dictionary are to be interpreted to be identical with the meanings within the context of the related art, and they are not interpreted as ideally or excessively formal meanings unless explicitly defined herein.

Hereinafter, exemplary embodiments of the present disclosure will be described in detail with reference to the accompanying drawings.

Figure 2:
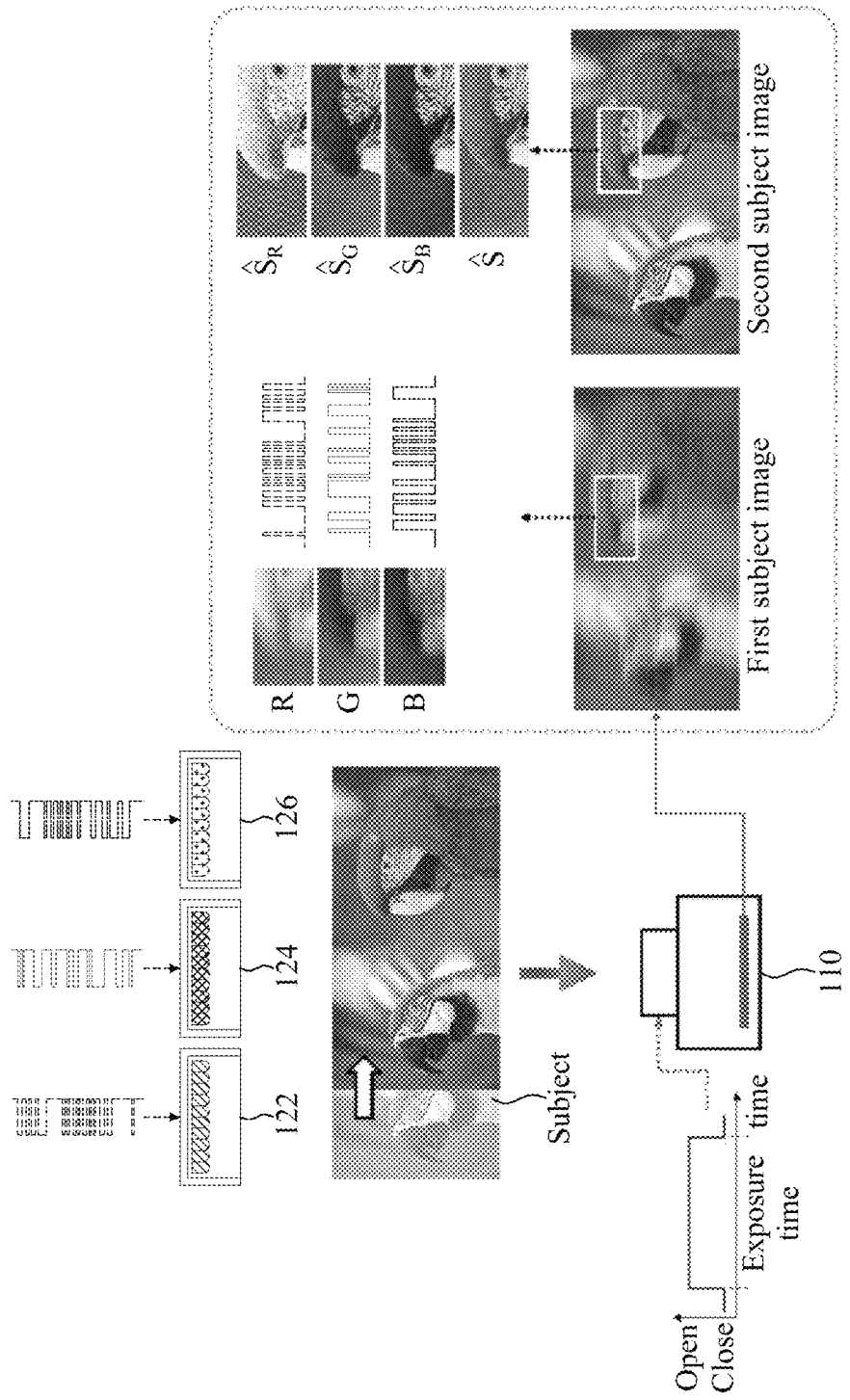
FIG. 2 is an operation diagram for describing an operation of the image processing device according to the present disclosure.
Figure 3A:
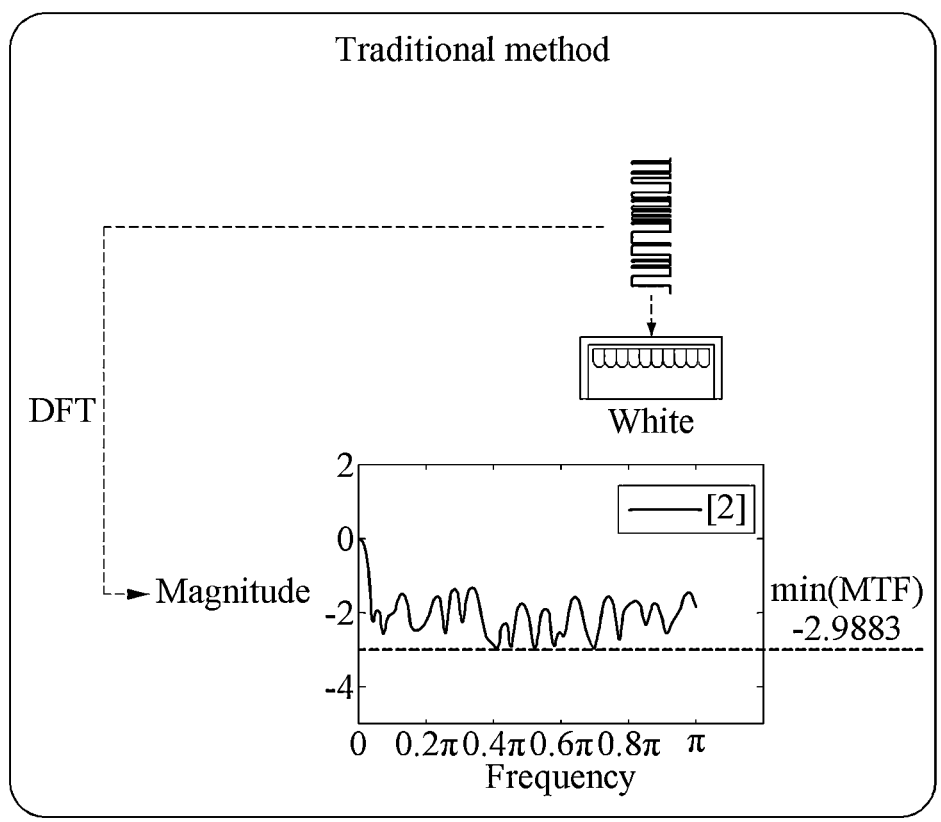
FIGS. 3A and 3B are graphs illustrating a modulation transfer function (MTF) for a point spread function for each color channel for the image processing device according to the present disclosure to output a second subject image from a first subject image.
Figure 3B:
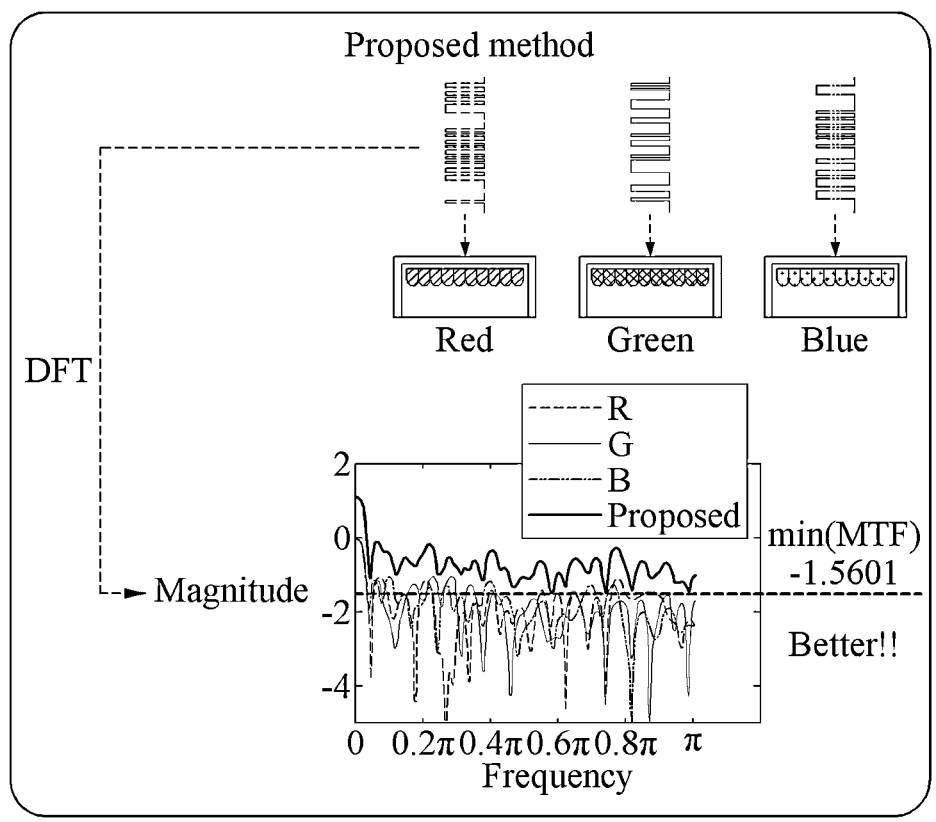

FIG. 1 is a control block diagram illustrating control components of an image processing device according to the present disclosure, FIG. 2 is an operation diagram for describing an operation of the image processing device according to the present disclosure, and FIGS. 3A and 3B are graphs illustrating a modulation transfer function (MTF) for a point spread function for each color channel for the image processing device according to the present disclosure to output a second subject image from a first subject image.

Referring to FIGS. 1 to 3B, the image processing device 100 may include a camera 110, a plurality of light sources 122, 124, 126, and a control unit 130.

The camera 110 may photograph a dynamic object, that is, a subject.

When a Bayer-pattern color filter array (CFA) is used, the camera 110 obtains images of three channels R, G, and B in one sheet, and thus, the plurality of (three) light sources 122, 124, and 126 are required.

In an embodiment, it will be described that the camera 110 uses the Bayer-pattern CFA, and accordingly, it will be described that the plurality of light sources 122, 124, and 126 emit a plurality of lights for the three channels R, G, and B.

The plurality of light sources 122, 124, and 126 may emit the plurality of lights for the three channels of R, G, and B, respectively.

In this case, the plurality of light sources 122, 124, and 126 may be turned on/off by the control unit 130 to emit the plurality of lights.

The control unit 130 may include a signal generation unit 132, an operation unit 134, and a signal processing unit 136.

The signal generation unit 132 may generate an optical coded pattern set including optical coded patterns optimized according to a complex modulation transfer function MTF for each of the plurality of light sources 122, 124, and 126 during a shutter exposure time of the camera 110.

That is, the optical coded pattern set may include optical coded patterns for each of a plurality of color channels corresponding to the plurality of lights and complementary to each other, and the optical coded patterns for each of the plurality of color channels may be patterns in which turn-on/off timings for each of the plurality of lights are set to be different from each other.

In other words, the optical coded patterns for each of the plurality of color channels may indicate times at which the lights are emitted from each of the plurality of light sources 122, 124, and 126, and may allow the plurality of lights emitted from the plurality of light sources 122, 124, and 126 to be emitted at different turn-on/off timings to make it easy to extract subject images for each of the plurality of channels from a first subject image captured by the camera 110.

The optical coded patterns may be point spread function (PSF) patterns, and may improve image processing performance.

The operation unit 134 may control a turn-on/off operation of each of the plurality of light sources 122, 124, and 126 according to the optical coded pattern set.

The signal processing unit 136 may extract the subject images for each of the plurality of channels from the first subject image captured by the camera 110.

That is, the first subject image may include the subject images for each of the plurality of channels according to the plurality of lights emitted from each of the plurality of light sources 122, 124, and 126.

The signal processing unit 136 may calculate point spread functions for each of different channels from the subject images for each of the plurality of channels.

The signal processing unit 136 may calculate complex modulation transfer function values of the point spread functions for each channel modulated by the optical coded patterns.

Thereafter, the signal processing unit 136 may output the second subject image in which motion blur is removed by performing deconvolution based on the complex modulation transfer function values.

That is, as illustrated in FIG. 2, the control unit 130 may receive the first subject image captured by the camera 110 by the plurality of lights emitted from the plurality of light sources 122, 124, and 126 according to the optical coded patterns for each color channel during the shutter exposure time at the time of photographing a subject, that is, a subject in which motion blur exists.

In this case, the control unit 130 may extract the subject images for each of the plurality of channels included in the first subject image, and may calculate the complex modulation transfer function values of the point spread functions for each of different channels modulated by the optical coded patterns from the subject images for each of the plurality of channels. The control unit 130 may output the second subject image in which the motion blur is removed by performing the deconvolution based on the complex modulation transfer function values.

FIG. 3A is an MTF graph illustrating frequency values frequency-converted through a Fourier transform of a point spread function for white in the first subject image when a single white light source is used, and FIG. 3B is an MTF graph illustrating frequency values for each channel frequency-converted through a Fourier transform of point spread functions for each of R, G, and B color channels in the first subject image when a plurality of lights, that is, R, G, and B lights are used.

Here, in FIG. 3B, the sum of respective MTFs is a black solid line, and FIG. 3B shows that the respective MTFs are complementarily optimized to generate a joint MTF with a high minimum value and low dispersion, such that complex modulation transfer function characteristics of the optical coded patterns are better, thereby illustrating that invertibility of a modulated point spread function of the first subject may be further improved.

Here, a traditional first subject may be represented by Equation 1.

$$i = h*s + n \qquad \text{[Equation 1]}$$

Here, i is a first subject image in which motion blur exists, h is a PSF indicating the motion blur, s is a clear image to be reconstructed, and n is noise. Here, s may be obtained by performing deconvolution of the motion blur h on a blur image i.

Traditionally, an external shutter or a white light source has been manipulated at high speed in order to modulate the motion blur h.

When i is a color image (e.g., an RGB or CMYG image), a clear image s is obtained through h equally modulated for each color channel.

In a case of FIG. 2 of the present disclosure, reconstruction performance is improved by using a light source corresponding to each color channel in one obtained image, and thus, the first subject is represented by Equation 2.

$$\sum_{c \in C} i_c = \sum_{c \in C} h_c * s_c + n_c \qquad \text{[Equation 2]}$$

Here, c indicates each color filter of a color filter array (CFA), and $\mathcal{C}$ indicates a set of color filters existing in the CFA (e.g., when the CFA is Bayer pattern, $\mathcal{C}$ ={R,G,B}, and when CFA is CMYG, $\mathcal{C}$ ={C,M,Y,G}).

In Equation 2, a difference from a traditional technology is that $h_c$ is modulated differently for each color channel. In this case, there may be an advantage in terms of an MTF as illustrated in FIGS. 3A and 3B. The MTF is an absolute value of an optical transfer function (OTF), and may be calculated by Equation 3.

$$MTF(\Omega) - |\mathcal{F}(\Omega)| - \sum_{c \in C} |\mathcal{F}(U_c)| \qquad \text{[Equation 3]}$$

$\Omega$ denotes an optical coded pattern set composed of $U_c$. In a case of the traditional technology, only a single pattern is used in order to modulate h, and thus, $\Omega =$, while in the present disclosure, different patterns are used for each color channel, and thus, in a case of a Bayer-pattern CFA used in order to describe the present disclosure, $\Omega = \{U_R, U_G, U_B\}$. The MTF for the optical coded pattern means invertibility, and traditionally, it may be assumed that an optical coded pattern having a small MTF dispersion and a great minimum value is a pattern having good invertibility.

A result obtained by optimizing the MTF based on such a basis and then comparing the optimized MFT with that in the traditional technology is illustrated in FIGS. 3A and 3B.

The present disclosure has better performance as compared with a single pattern. The reason is that the present disclosure is based on a theory that an autocorrelation of multiple patterns is closer to 0 than an autocorrelation of a single pattern is, and the autocorrelation is related to dispersion of the MTF as represented by Equation 4.

$$\sum_{k=1}^{m-1} \sum_{c \in C} |\Psi_k^c|^2 = \frac{1}{2} \int_{-\pi}^{\pi} \left[ \sum_{c \in C} |\mathcal{F}(U_c)|^2 - Cm \right]^2 d\theta \qquad \text{[Equation 4]}$$

Ψ is an autocorrelation function, and c is a k-th element of a c-th pattern. C is a total number of color filters of $\wp$. When C≥2, a left term of Equation 4, which is the sum of autocorrelations, may converge to 0. That is, it means that a variance of the MTF, which is a right term equation, may converge to 0. As described above, since the optical coded pattern having the small dispersion and the great minimum value has the good invertibility, it may mean that a clear image is better reconstructed when a multi-pattern, that is, the optical coded pattern set, is used as illustrated in FIG. 3B when the single pattern is used in the traditional technology as illustrated in FIG. 3A.

Figure 4:
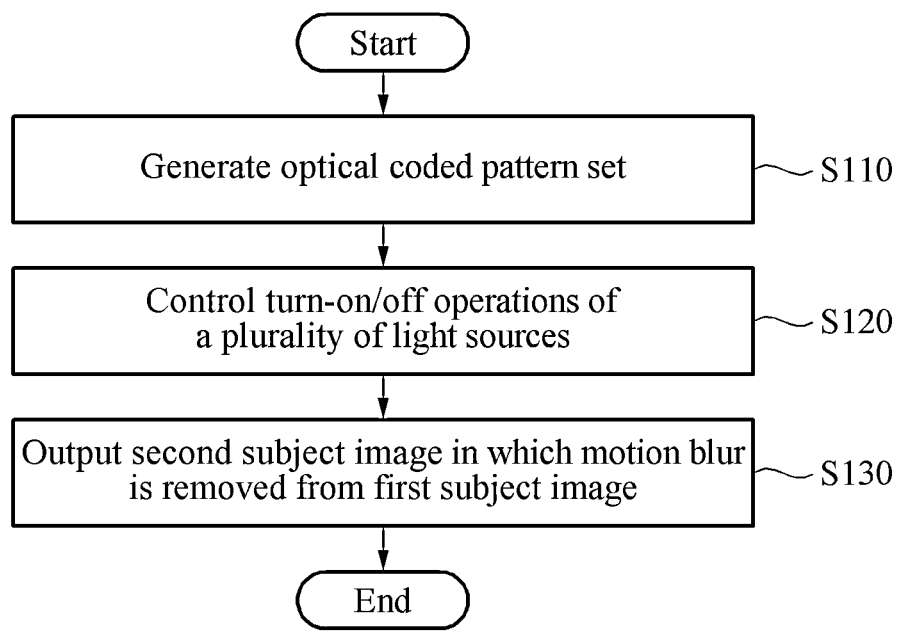
FIG. 4 is a flowchart illustrating an operation method of the image processing device according to the present disclosure.

FIG. 4 is a flowchart illustrating an operation method of the image processing device according to the present disclosure.

Referring to FIG. 4, the control unit 130 of the image processing device 100 may generate the optical coded pattern set including the optical coded patterns for each of the plurality of light sources 122, 124, and 126 during the shutter exposure time of the camera 110 (S110).

Here, the optical coded pattern set may include optical coded patterns for each of a plurality of color channels corresponding to the plurality of lights and complementary to each other, and the optical coded patterns for each of the plurality of color channels may be patterns in which turn-on/off timings for each of the plurality of lights are set to be different from each other.

In other words, the optical coded patterns for each of the plurality of color channels may indicate times at which the lights are emitted from each of the plurality of light sources 122, 124, and 126, and may allow the plurality of lights emitted from the plurality of light sources 122, 124, and 126 to be emitted at different turn-on/off timings to make it easy to extract subject images for each of the plurality of channels from a first subject image captured by the camera 110.

The optical coded patterns may be point spread function (PSF) patterns, and may improve image processing performance.

The control unit 130 may control a turn-on/off operation of each of the plurality of light sources 122, 124, and 126 according to the optical coded pattern set (S120).

The control unit 130 may output the second subject image in which the motion blur is removed from the first subject image captured by the camera 110 (S130).

That is, the control unit 130 may extract the subject images for each of the plurality of channels from the first subject image, and may calculate the point spread functions for each of different channels modulated by the optical coded patterns from the subject images for each of the plurality of channels.

Thereafter, the control unit 130 may calculate complex modulation transfer function values through a Fourier transform of the point spread functions for each channel, and output the second subject image in which the motion blur is removed by performing deconvolution based on the complex modulation transfer function values.

The image processing device and the operation method thereof according to the present disclosure may output the second subject image in which the motion blur is removed from the first subject image obtained by photographing the subject by applying the optical coded patterns for each color generated with the complex modulation transfer function in order to control each of the plurality of light sources at the time of photographing the subject.

In addition, the image processing device and the operation method thereof according to the present disclosure may process and output the second subject image that is clear, based on the point spread functions modulated for each channel according to the point spread functions for each color channel for the plurality of lights emitted from each of the plurality of light sources.

Meanwhile, effects of the present disclosure are not limited to the above-mentioned effects, and various effects may be included within the range apparent to those skilled in the art from a description to be described later.

Features, structures, effects, and the like, described in embodiments hereinabove are included in at least one embodiment of the present disclosure, and are not necessarily limited to only one embodiment. Furthermore, features, structures, effects, and the like, exemplified in each embodiment may be combined with each other or modified for other embodiments by those skilled in the art to which embodiments belong. Accordingly, contents related to such combinations and modifications are to be interpreted as falling within the scope of the present disclosure.

In addition, although an embodiment has been mainly described hereinabove, this is mere an example and does not limit the present disclosure, and those skilled in the art to which the present disclosure pertains may understand that several modifications and applications that are not described hereinabove may be made without departing from the spirit and scope of the present disclosure. For example, the respective components specifically described in an embodiment of the present disclosure may be modified. In addition, differences associated with these modifications and applications are to be interpreted as falling within the scope of the present invention as defined by the following claims.

What is claimed is:

1. An image processing device comprising:
   a plurality of light sources;
   a camera outputting a first subject image obtained by photographing a subject; and
   a controller configured to control each of the plurality of light sources according to an optical coded pattern set based on a complex modulation transfer function during a shutter exposure time of the camera, and to output a second subject image in which motion blur is removed from the first subject image according to point spread functions for each color channel modulated by the optical coded pattern set.

2. The image processing device of claim 1, wherein the controller comprises:
   a signal generator configured to generate the optical coded pattern set based on the complex modulation transfer function during the shutter exposure time;
   an operation unit configured to control a turn-on/off operation of each of the plurality of light sources according to the optical coded pattern set; and
   a signal processor configured to output the second subject image in which the motion blur is removed based on complex modulation transfer function values of the point spread functions for each channel from the first subject image.

3. The image processing device of claim 2, wherein the optical coded pattern set comprises optical coded patterns for each of a plurality of color channels corresponding to the plurality of lights from a plurality of lights sources and complementary to each other.

4. The image processing device of claim 3, wherein the optical coded patterns for each of the plurality of color channels have different turn-on/off timings for the plurality of lights.

5. The image processing device of claim 2, wherein the signal processor is further configured to calculate the complex modulation transfer function values by performing a Fourier transform of the point spread functions for each channel modulated by the optical coded pattern set.

6. The image processing device of claim 5, wherein the signal processor is further configured to output the second subject image by performing deconvolution of the point spread functions for each channel in the first subject image based on the complex modulation transfer function values.

7. The image processing device of claim 2, wherein the optical coded pattern set comprises optical coded patterns for each of a plurality of color channels having different turn-on/off timings for each of the plurality of lights.

8. A processor-implemented method of operation an image processing device, comprising:
 generating an optical coded pattern set based on a complex modulation transfer function so that a plurality of lights are emitted from a plurality of light sources;
 controlling each of the plurality of light sources with the optical coded pattern set so that a camera photographs a subject during a shutter exposure time; and
 outputting a second subject image in which motion blur is removed from a first subject image according to point spread functions for each color channel modulated by the optical coded pattern set when the first subject image is input from the camera, the first subject image being obtained by photographing the subject.

9. The operation method of an image processing device of claim 8, wherein the optical coded pattern set comprises optical coded patterns for each of a plurality of color channels corresponding to the plurality of lights, determined by the complex modulation transfer function, and complementary to each other, and
 the optical coded patterns for each of the plurality of color channels have different turn-on/off timings for the plurality of lights.

10. The operation method of an image processing device of claim 8, wherein the outputting of the second subject image comprises outputting the second subject image in which the motion blur is removed based on complex modulation transfer function values of the point spread functions for each channel from the first subject image.

11. The operation method of an image processing device of claim 10, wherein the outputting of the second subject image comprises outputting the second subject image by performing deconvolution of the point spread functions for each channel in the first subject image based on the complex modulation transfer function values.

* * * * *